United States Patent [19]

Gobien

[11] Patent Number: 4,643,063

[45] Date of Patent: Feb. 17, 1987

[54] TUBE CUTOFF MACHINE

[75] Inventor: Eric W. Gobien, Delevan, N.Y.

[73] Assignee: McKenica Inc., Buffalo, N.Y.

[21] Appl. No.: 761,752

[22] Filed: Aug. 1, 1985

[51] Int. Cl.⁴ .................. B23D 21/00; B23D 25/04
[52] U.S. Cl. ................................ 83/311; 83/295; 83/320; 83/592
[58] Field of Search .............................. 83/318-320, 83/592, 311, 295; 74/44

[56] References Cited

U.S. PATENT DOCUMENTS

| | | |
|---|---|---|
| 789,776 | 5/1905 | White . |
| 1,726,256 | 8/1929 | Buttner ............................ 83/318 |
| 2,953,955 | 9/1960 | Underhill ...................... 83/592 X |
| 3,114,282 | 12/1963 | Reifenhauser et al. ......... 83/592 X |
| 3,292,472 | 12/1966 | McKenica ........................... 83/291 |
| 3,827,323 | 8/1974 | Jacobs ............................ 83/320 X |
| 4,114,490 | 9/1978 | Braun ............................. 83/318 X |
| 4,191,078 | 3/1980 | Steinhilber ......................... 83/320 |
| 4,383,172 | 5/1983 | Holler ................................ 250/308 |
| 4,437,372 | 3/1984 | Ishigami ............................. 83/320 |
| 4,451,732 | 5/1984 | Spongr ............................... 250/308 |
| 4,462,290 | 7/1984 | Wallis ............................ 83/320 X |

OTHER PUBLICATIONS

Model MSH-6, Tube Cutoff Machine Brochure, McKenica, Inc., Buffalo, NY.

Primary Examiner—James M. Meister
Attorney, Agent, or Firm—Christel, Bean & Linihan

[57] ABSTRACT

A tube cutoff machine for cutting a tube to precise lengths, which tube may be exiting from a tube mill at relatively high speeds. The tube cutoff machine includes a frame which supports a carriage for generally linear reciprocal movement parallel to the linear path of movement of the tube, the carriage in turn supporting a tube shearing apparatus. The carriage is reciprocated by a crank drive mechanism and additional connecting structure, which insures that the carriage will move at a constant linear speed for a duration of time sufficient to shear the tube as the carriage moves from a first location to a second location. The additional connecting structure includes a bell crank having an intermediate portion which is pivotally secured to the carriage, one end of the bell crank being secured to an end of a connecting rod of the crank drive mechanism, and the other end of the bell crank being provided with a cam follower which is caused to engage a stationary cam carried by the frame. The tube shearing apparatus includes a rotating disk, a tube shearing knife carried by the disk and a die through which the tube passes, the knife also passing through the die during the shearing operation.

8 Claims, 6 Drawing Figures

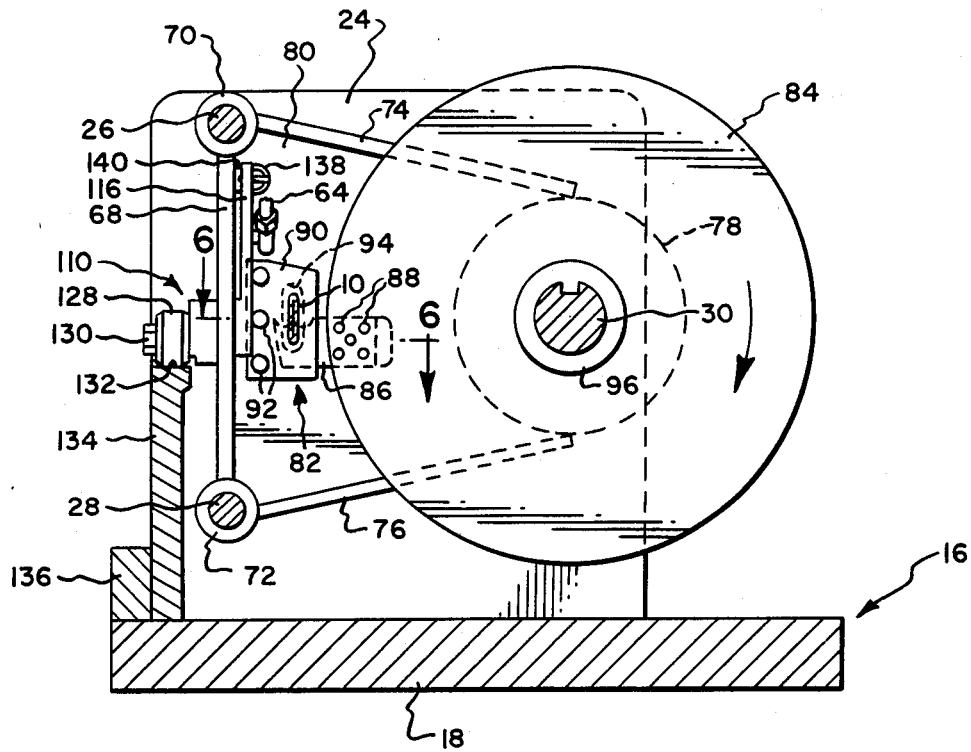
Fig. 3.
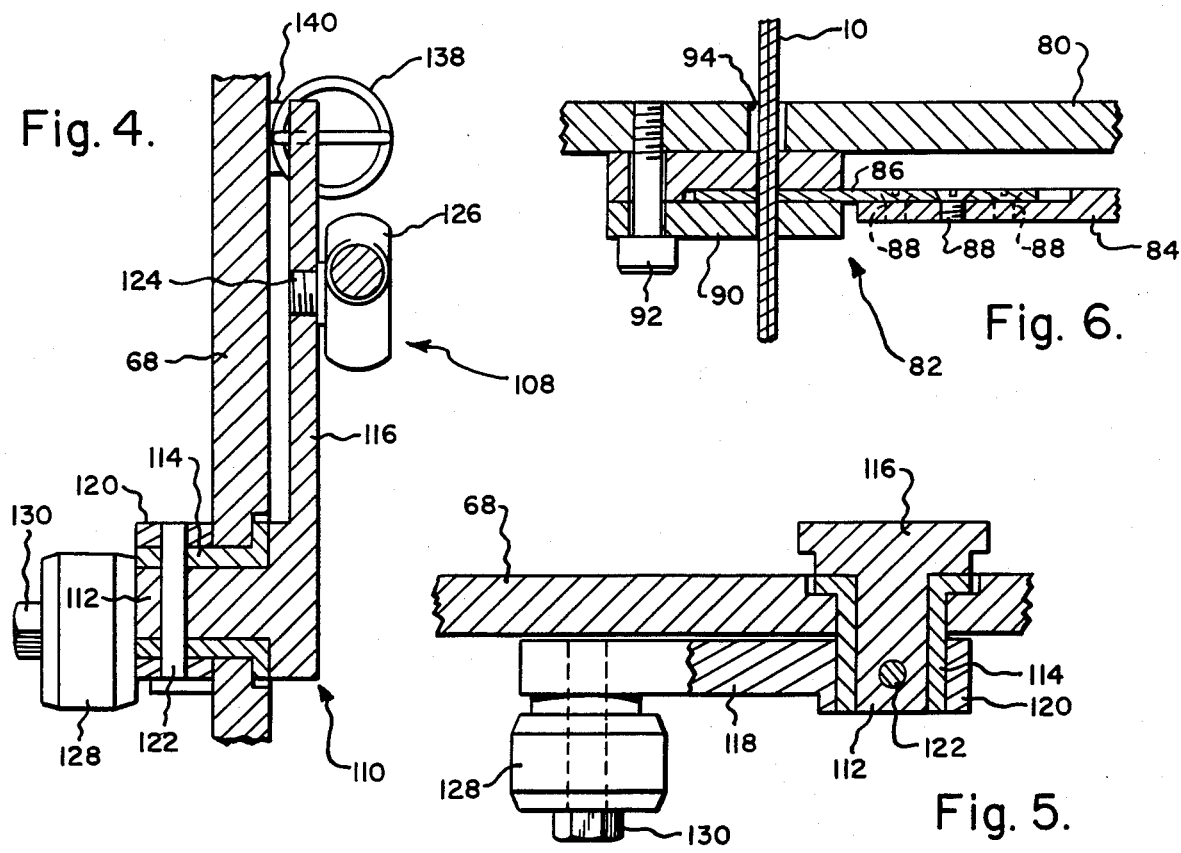
Fig. 4.
Fig. 6.
Fig. 5.

TUBE CUTOFF MACHINE

FIELD OF THE INVENTION

The present invention relates to a machine for cutting a continuously moving tube to precise lengths, and more specifically wherein the cutting of the tube can be performed while the tube is moving at speeds up to 500' per minute.

BACKGROUND OF THE INVENTION

Heat exchanger tubes which are used in automobile radiators are typically manufactured in a tubing mill, the tube as it exits from the mill being cut to precise repeatable lengths, for example 21". Various machines have been developed for cutting the tubes to length and one such machine is shown in U.S. Pat. No. 3,292,472 issued Dec. 20, 1966. While the aforesaid patent could precisely cut tubes to repeatable lengths, the apparatus of said patent was limited to use with tube mills wherein the speed of the tube as it exited from a tube mill did not exceed 210' per minute. Recently tube cutting machines have been developed which can operate at higher tube speeds, one being shown in U.S. Pat. No. 4,462,290, issued July 31, 1984, and another being the McKenica model MHS-6 welded seam radiator tube cutoff machine. In each of these designs, the output shaft of a motor is connected to one end of a connecting rod with various cams, the other end of the connecting rod being connected through a pivot pin to a carriage. The cams cause the carriage to be moved at a linear speed equal to the speed of the tube to be cut during a limited portion of movement. However, it is desirable that tube cutoff machines operate at even higher tube speeds as the tube mills presently on the market can operate at higher speeds than the tube cutoff machines presently on the market.

OBJECTS AND SUMMARY OF THE INVENTION

It is an object of the present invention to provide an improved apparatus for cutting a tube, the apparatus being capable of operating at higher tube speeds than present day commercially available tube cutoff machines.

More specifically, it is an object of the present invention to provide a novel tube cutoff machine for cutting tubes of precise length from a tube which moves at a relatively high speed, the tube cutoff machine being of a simplified design, lower cost and higher reliability than prior tube cutoff machines.

It is a further object of the present invention to provide a novel tube shearing apparatus for a tube cutoff machine of the type referred to.

The above objects and other objects and advantages of the prsent invention are accomplished by providing a frame which supports a carriage for generally linear reciprocal movement between first and second locations parallel to the linear path of movement of a tube which may exit from a tube mill. The carriage is reciprocated by a crank drive mechanism and supports a tube shearing apparatus. Connecting means are provided which connect the crank drive mechanism with the carriage in such a manner that the carriage will be caused to be moved at a constant linear speed for a duration of time sufficient to shear the tube as the carriage moves from the first location to the second location. In addition, shear operating means are provided which are capable of operating the shearing apparatus when the carriage is being moved at said constant linear speed. The connecting means includes a bell crank having an intermediate portion which is pivotally secured to the carriage, one end of a connecting rod, which is part of the rotating crank drive mechanism, being secured to one end of the bell crank, and the other end of the bell crank being provided with a cam follower which is caused to engage a stationary cam. The tube shearing apparatus includes a rotating disk, a tube shearing knife carried by the disk, and a die through which the tube passes, the knife also passing through the die during the shearing apparatus.

The foregoing will be more fully understood from a consideration of the following detailed description taken in conjunction with the accompanying drawings.

BRIEF DESCRIPTION OF THE FIGURES

FIGS. 3, 4 and 5 are sections taken generally along the lines 3—3, 4—4, and 5—5 in FIG. 1.

FIG. 6 is a section taken generally along the line 6—6 in FIG. 3.

DETAILED DESCRIPTION

Figure 1:
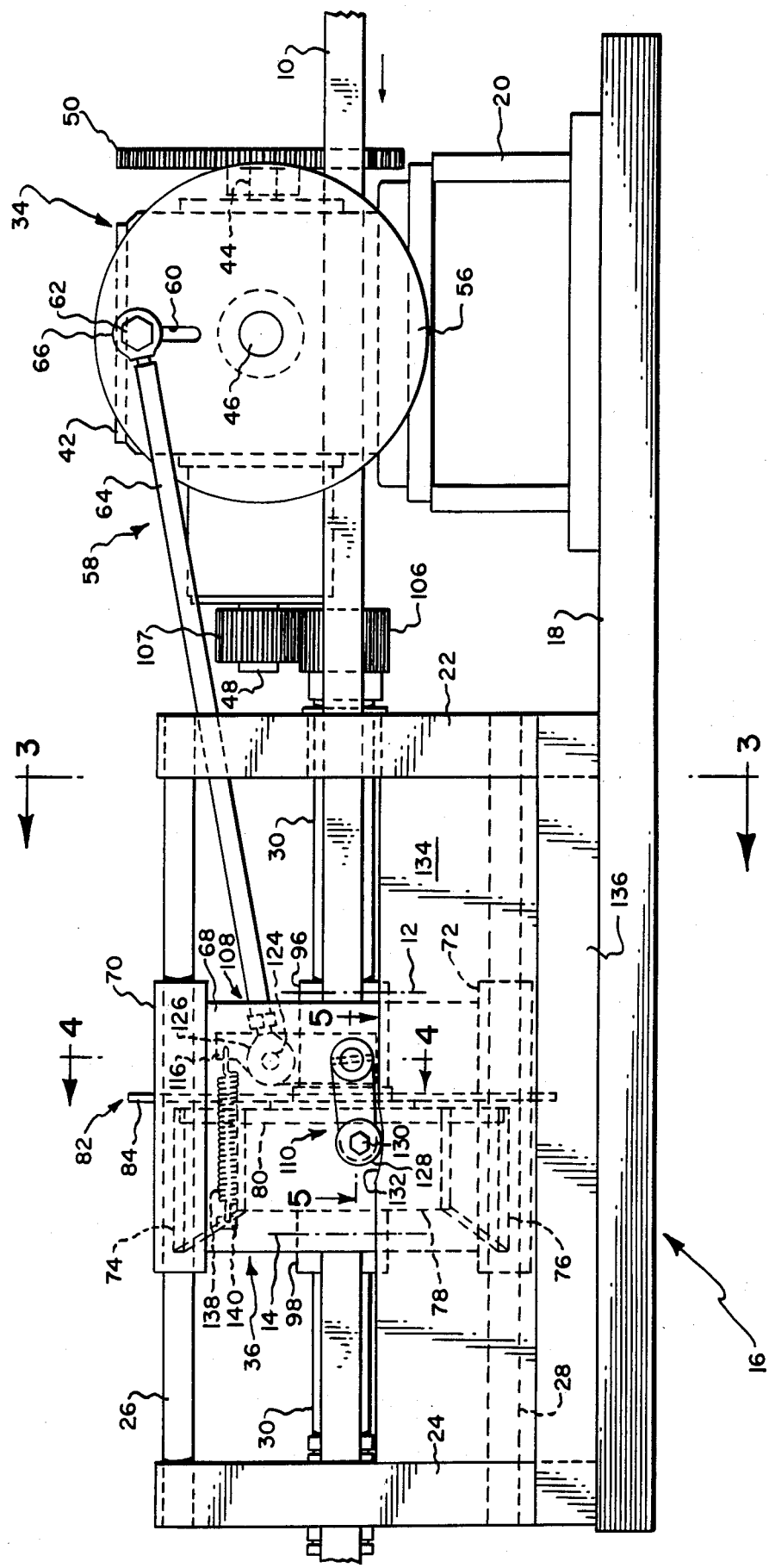
FIG. 1 is a side view of a tube cutting apparatus employing the novel features of this invention.
Figure 2:
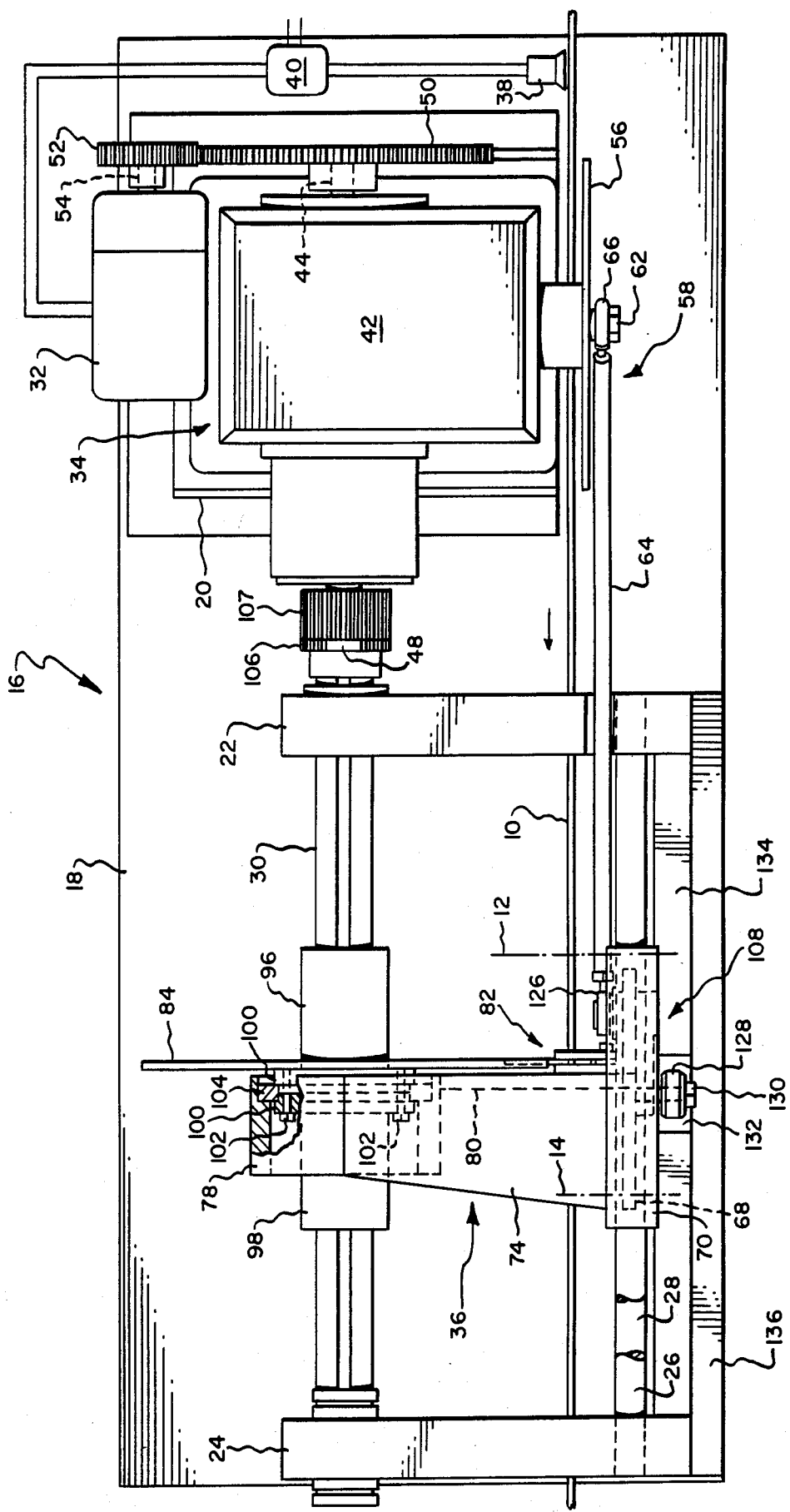
FIG. 2 is a top view of the apparatus shown in FIG. 1.

Referring initially to FIGS. 1 and 2, a tube 10 is illustrated, which tube can be exiting from a tubing mill and will be passing through the tube cutting apparatus of this invention along a predetermined generally linear path. The tube as it exits from the tubing mill will be in a flat form and could be formed either by welding, or by lock seaming. In any event, the tube will be moving at a generally high rate of speed, for example 440' per minute, initially past a first location, indicated by the dot dash line 12 and then past a second location indicated by the dot dash line 14. The tubing mill is not illustrated as such machines are relatively well known in the art. The apparatus of the present invention includes a frame, indicated generally at 16, upon which various components are mounted. Thus, the frame includes a base plate 18, a gear box support 20 and first and second spaced apart vertical support members 22, 24. Upper and lower cylindrical rails 26, 28 extend between the first and second vertical support members 22, 24, respectively. The cylindrical rails are mounted in such a manner that they are parallel to the predetermined generally linear path of travel of the tube 10. In addition, the support members 22 and 24 are provided with axially aligned bearings in which a spline shaft 30 is journaled, the spline shaft also being parallel to the predetermined generally linear path of travel of the tube. The spline shaft may have a single spline or keyway as illustrated, or may have a plurality of splines.

Mounted upon the frame 16 is a variable speed electric motor 32 (FIG. 2), a double output shaft gear box, indicated generally at 34, and a carriage indicated generally at 36. In addition, a tube speed sensor 38 and a motor control means 40 may also be mounted on the frame. The tube speed sensor 38 senses the speed of the moving tube and the motor control means causes the output speed of the motor 32 to be proportional to the speed of the tube and the length of cut in a manner which will be more fully brought out below. The double output shaft gear box 34 includes an enclosure 42, there being an input shaft 44 (FIG. 2) which extends to one side of the enclosure, an output shaft 46 (FIG. 1) at right angles to the input shaft, and a second output shaft 48 which is coaxial with the input shaft. A driven gear 50 is mounted upon the input shaft 44, the driven gear 50 being in turn in mesh with a drive gear 52 mounted upon the output shaft 54 of the motor 32.

The first output shaft 46 of the gear box 34 carries a drive wheel 56 for rotation with the output shaft 46, the drive wheel in turn forming part of a rotating crank drive mechanism indicated generally at 58. As can best be seen from FIG. 1, the drive wheel 56 is provided with a radially extending slot 60 which may receive pin means 62. The pin means can be secured to the drive wheel at varying fixed locations spaced away from the axis of rotation of the drive wheel. The rotating crank drive mechanism further includes a connecting rod 64 one end 66 of which is journaled about the pin means 62.

The carriage includes a vertically extending frame member 68 provided with upper and lower linear bearings 70, 72 which are disposed about the cylindrical rails 26, 28, respectively. As can be seen from FIG. 3, upper and lower transversely extending members 74, 76, respectively, are provided, one end of each of the members being welded or otherwise rigidly secured to an associated linear bearing, and the other ends of the transversely extending members 74, 76 being rigidly secured to a hub 78. In addition, the carriage further includes a transversely extending vertical plate 80 which is welded to or otherwise rigidly secured to the frame member 68, the upper and lower transversely extending member 74, 76, and hub 78.

A tube shearing apparatus, indicated generally at 82, is supported on the carriage. The tube shearing apparatus includes a rotating disk 84, a tube shearing knife 86 which is secured to the disk 84 by fasteners 88, and a die 90 which is bolted to the transversely extending vertical plate 80 by bolts 92. As can be seen from FIG. 6, the die is provided with a suitable aperture for the reception of the tube 10 and similarly the plate 80 is also provided with suitable aperture 94 through which the tube 10 may pass. The knife 86 may also pass between spaced apart locations of the die 90 for the purpose of severing the tube.

Mounted upon the spline shaft 30 are a pair of spline bushings, there being a right hand spline bushing 96 and a left hand spline bushing 98. Each of the spline bushings is provided with a flange 100 and the flanges 100 of each of the bushings is secured to the other flange by means of fasteners 102. Disposed between the flanges is a ring 104 which is in turn supported within the hub 78. It should be apparent from an inspection of FIG. 2 that the bushings 96 and 98 can rotate with respect to the hub 78 but will cause the hub to be moved along the spline shaft 30 as the carriage is moved from the first to the second position and then back to the first position. The disk 84 is in turn rigidly secured to the flange 100 of the right spline bushing 96. Thus, the disk 84 will be caused to be rotated when the spline shaft 30 is rotated.

The spline shaft 30 forms part of a shear operating means, the shaft 30 in turn being operated by means of a driven gear 106 mounted upon the right hand end of the shaft 30. The gear 106 is in turn caused to be driven by a drive gear 107 mounted upon the output shaft 48 of the double output shaft gear box 34.

Connecting means, indicated generally at 108, are provided for connecting the rotating crank drive mechanism 58 with the carriage 36. The connecting means includes a bell crank indicated generally at 110 in FIG. 4. An intermediate portion 112 of the bell crank is secured to a bushing 114 rotatably supported by the frame member 68 of the carriage 36. As can best be seen from an inspection of FIGS. 4 and 5, one arm 116 of the bell crank is disposed to one side of the frame member 68 and the other arm 118 is disposed to the other side of the frame member 68. In this connection, it should be noted that the arm 118 is provided with a suitable hub 120 which is disposed about the bushing 114 and is pinned to the bushing 114 and intermediate portion 112 by means of a pin 122. A portion of the arm 116 remote from the intermediate portion 112 of the bell crank is provided with a pivot pin 124 (FIG. 1) about which the other end 126 of the connecting rod is journaled. The end of the other bell crank arm 118 remote from the intermediate portion 112 is in turn provided with a cam follower 128, the cam follower being rotatably mounted on the arm for rotation about bolt 130. The cam follower is adapted to engage a cam surface 132 (FIG. 1) which is formed on the upper surface of a plate 134 (FIG. 3) which is rigidly secured to the base plate 18 by means of bracket 136. The cam follower 128 is caused to bear against the cam surface 132 by means of a spring 138 one end of which engages the arm 116 of the bell crank at a position above the pivot pin 124, the other end of the spring being secured to a bracket 140 carried by the frame member 68.

It should be appreciated at this point that, if the other end of the connecting rod were connected directly to the carriage, that as the drive wheel rotates, the carriage speed, if plotted out, would correspond to a sine wave. However, by providing the connecting means 108, it is possible to cause the carriage to have a linear motion for the length that the cam follower contacts the cam surface 132. In a full scale machine this length is approximately 2"-2½" in length. This linear motion is sufficient to ensure that the tube shearing apparatus supported on the carriage will move at the same speed as the tube 10 during the shearing operation.

The length of the tube cut by the apparatus of this invention is preferably varied by varying the distance of the pin means 62 from the axis of the drive wheel. Thus, if the length of the tube to be cut is to be 12", the pin means is spaced away from the axis a distance equal to 12" divided by $\pi$ so that the circumference traveled by the pin means 62 is 12". Similarly, if the cut length is to be 24", the circumference traveled by the connecting pin 62 is set at 24". The RPM of the drive wheel is proportional to the speed of the tube and inversely proportional to the circumference. Thus, if the circumference has been set at two feet (for cutting a two foot length of tube) and if the tube is moving at a speed of 350' per minute, the RPM of the drive wheel 56 should be 175 (350 divided by the two foot circumference). Similarly, if the tube speed is 200' per minute, the RPM of the drive wheel should be 100 (200 divided by the two foot circumference). The cam mechanism will ensure that the speed of the shuttle is exactly the same as the tube speed during the 2½" of movement provided that the circumference traveled by the pin means 62 and the RPM's of the drive wheel 56 are properly adjusted.

The length of cut will be inputted into the motor control means by the operator after the pin means has been set to the proper location, and once the apparatus starts running the speed sensor will maintain the proper rpm of the drive wheel.

It can be seen from the foregoing description that the carriage of this invention can be caused to be moved at the same linear speed as the tube to be cut during a portion of the cutting operation. By utilizing a rotating knife mechanism, rather than the reciprocal knife mechanism of the prior art, the length of time that the knife is actually engaging the tube may be shortened as it is not necessary to decelerate the knife and to then reverse its direction of rotation as in prior art designs. Also, the cam design of this mechanism is of a relatively lower cost than prior art cam designs, and yet is of a highly reliable design.

While a preferred embodiment has been disclosed, it is to be understood that the present invention is not to be limited to the particular details shown and described above, but that, in fact, widely differing means may be employed in the practice of the broader aspects of this invention.

What is claimed is:

1. Apparatus for cutting a tube to relatively precise lengths, which tube moves along a predetermined generally linear path initially past a first location and then past a second location at a substantially constant speed; said apparatus including
    a frame;
    a carriage mounted on the frame for generally linear reciprocal movement between the first and second locations and parallel to said linear path;
    a tube shearing apparatus supported on said carriage;
    a rotating crank drive mechanism including a drive wheel rotatable about its axis, a connecting rod, and pin means on said drive wheel at a location spaced away from the axis of said drive wheel, one end of the connecting rod being journalled on said pin means;
    connecting means which connects the other end of the connecting rod with said carriage in such a manner that said carriage will be moving at a constant linear speed for a duration of time sufficient to shear said tube as the carriage moves from the first location to the second location, said connecting means including a cam follower and a cam supported by said frame and which is engaged by said cam follower; and
    shear operating means capable of operating said shearing apparatus when the carriage is being moved at said constant linear speed.

2. The apparatus as set forth in claim 1 wherein the tube shearing apparatus includes a rotating disk, a tube shearing knife carried by said disk, and a die through which the tube passes, said knife also passing through said die during the shearing operation.

3. An apparatus for cutting a tube to relatively precise lengths, which tube moves along a predetermined generally linear path initially past a first location and then past a second location at a substantially constant speed; said apparatus including
    a frame;
    a carriage mounted on the frame for generally linear reciprocal movement between the first and second locations and parallel to said linear path;
    a tube shearing apparatus supported on said carriage, said tube shearing apparatus including a rotating disk, a tube shearing knife carried by said disk, and a die through which the tube passes, said knife also passing through said die during the shearing operation;
    carriage drive means capable of causing the carriage to be moved at a constant linear speed for a duration of time sufficient to shear said tube as the carriage moves from the first location to the second location; and
    shear operating means capable of operating said shearing apparatus when the carriage is being moved at said constant linear speed, said shear operating means including a spline shaft parallel to the linear path, said rotating disk being disposed about said spline shaft for sliding movement thereon and for rotational movement with said shaft, said shear operating means further including means to cause said spline shaft to rotate once for every cycle of reciprocal movement of said carriage.

4. An apparatus for cutting a tube to relatively precise lengths, which tube moves along a predetermined generally linear path initially past a first location and then past a second location at a substantially constant speed; said apparatus including
    a frame;
    a carriage mounted on the frame for generally linear reciprocal movement between the first and second locations and parallel to said linear path;
    a tube shearing apparatus supported on said carriage;
    a rotating crank drive mechanism including a drive wheel rotatable about its axis, a connecting rod, and pin means on said drive wheel at a location spaced away from the axis of said drive wheel, one end of said connecting rod being journalled on said pin means;
    connecting means which connects said rotating crank drive mechanism with said carriage in such a manner that said carriage will be moved at a constant linear speed for a duration of time sufficient to shear said tube as the carriage moves from the first location to the second location, said connecting means including a bell crank, an intermediate portion of the bell crank being pivotally secured to said carriage, the other end of the connecting rod being pivotally mounted on one end of said bell crank, and the other end of the bell crank including a cam follower, said connecting means further including a cam which is engaged by the cam follower to cause said carriage to move at a constant linear speed for a duration of time; and
    shear operating means capable of operating said shearing apparatus when the carriage is being moved at said constant linear speed.

5. The apparatus as set forth in claim 4 wherein said cam is mounted on said frame.

6. An apparatus for cutting a tube to relatively precise lengths, which tube moves along a predetermined generally linear path initially past a first location and then past a second location at a substantially constant speed; said apparatus including
    a frame;
    a carriage mounted on the frame for generally linear reciprocal movement between the first and second locations and parallel to said linear path;
    a tube shearing apparatus supported on said carriage;
    a rotating crank drive mechanism including a drive wheel rotatable about its axis, a connecting rod, and pin means on said drive wheel at a location spaced away from the axis of said drive wheel, one end of the connecting rod being journalled on said pin means;

connecting means which connects the other end of said connecting rod with said carriage in such a manner that said carriage will be moving at a constant linear speed for a duration of time sufficient to shear said tube as the carriage moves from the first location to the second location;

a variable speed electric motor having an output shaft which is drivingly interconnected with said drive wheel;

a tube speed sensor and motor control means which causes the output speed of the output shaft of the motor to be such that the pin means on the drive wheel will move at a speed approximately the tube travel speed; and shear operating means capable of operating said shearing apparatus when the carriage is being moved at said constant linear speed.

7. The apparatus as set forth in claim 6 wherein the tube shear includes a rotating disk, a tube shearing knife carried by said disk, and a die through which the tube passes, said knife also passing through said die during the shearing operation, and wherein the shear operating means include a spline shaft parallel to the linear path of said tube, said rotating disk being disposed about said spline shaft for sliding movement thereon and for rotational movement with said shaft.

8. The apparatus as set forth in claim 7 wherein the output shaft of the variable speed electric motor is interconnected with said drive wheel by a double output shaft gear box mounted on said frame, the first of said output shafts being connected to said drive wheel and the second of said output shafts being connected to said spline shaft, the second output shaft being rotated at the same rate as the first output shaft to cause the spline shaft to rotate once for every complete cycle of reciprocal movement of said carriage.

* * * * *